United States Patent Office 3,555,761
Patented Jan. 19, 1971

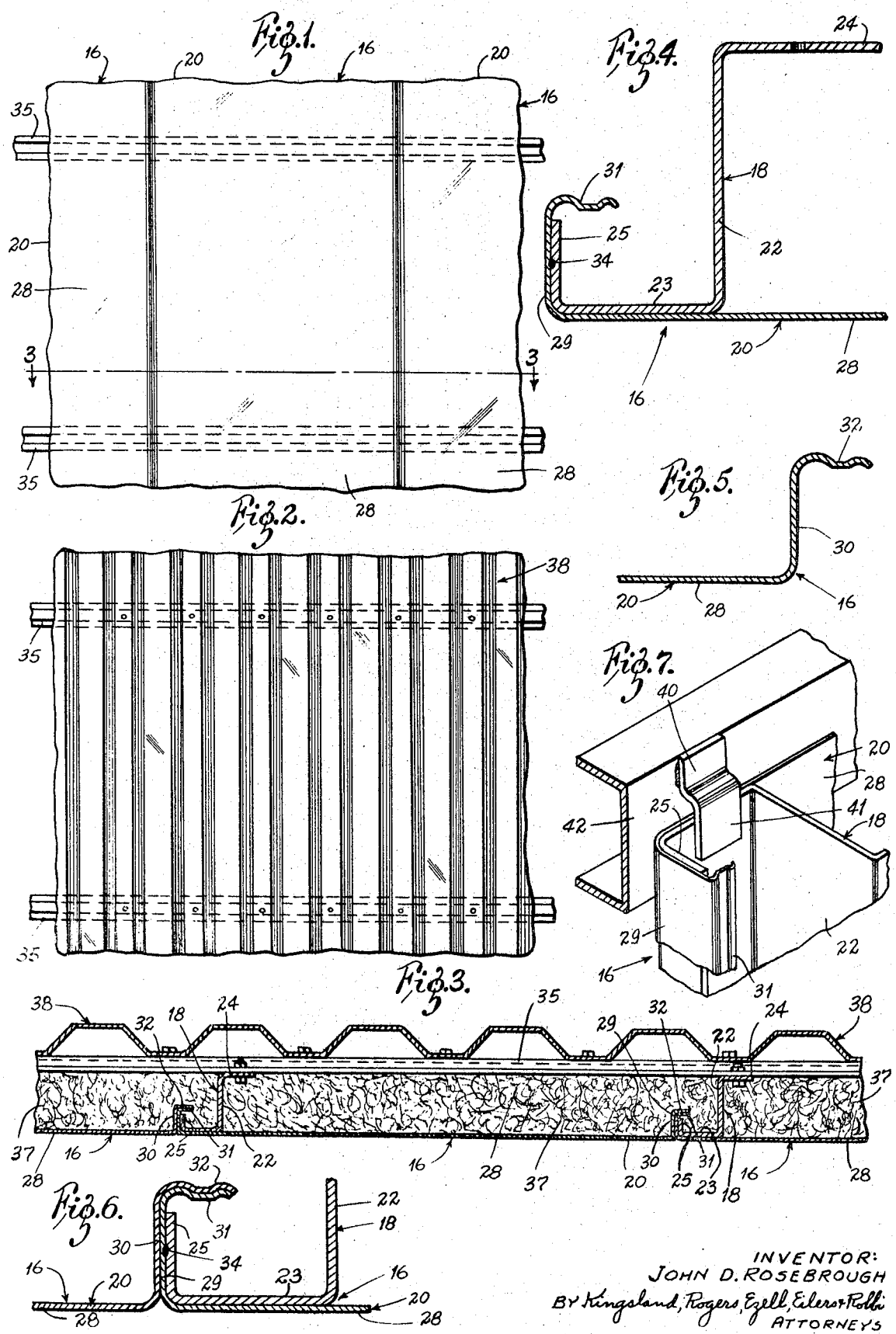

3,555,761
WALL CONSTRUCTION
John D. Rosebrough, R.R. 3, Box 25AB,
Chesterfield, Mo. 63017
Filed Apr. 3, 1968, Ser. No. 723,346
Int. Cl. E04b 2/28, 2/60; E04c 2/08
U.S. Cl. 52—478                                   5 Claims

ABSTRACT OF THE DISCLOSURE

A no-girt wall module, wall and method of factory constructing the module, the module including a structural member and channel panel welded together to form a unit, the Z member being disposed in the panel with one return flange welded to a side of the channel substantially midway of both, the wall comprising a plurality of factory-made modules secured together, the method comprising so welding the elements for out-of-sight disposition of the weld. A wall retainer clip permitting deflection of a related roof truss and the like is of elongated form and has an offset portion receiving the Z for relative movement.

SUMMARY AND OBJECTS OF THE INVENTION

In brief, the present novel wall module includes a Z structural member and a channel panel, the Z resting in the latter against the bight with a returned flange adjacent and welded to a panel wall, the weld being substantially midway of each. Each panel wall has a flange, said flanges extending in the same direction. Modules are secured together in the field to provide the present novel load-bearing wall. The novel method of producing said module includes factory welding said Z and channel panel as stated. A novel retainer clamp has a Z receiving offset.

Objects of the invention are to provide a novel wall module which includes an out-of-sight weld when assembled as a wall, which is strong permitting shipment and field erection, which has no clearance problem at lap, which is readily caulked and sealed, which adapts itself to variations in depth and gage of the Z member and of the channel panel, which is load bearing and permits cantilever support of parapet walls, which allows wider spacing of sub-girts, which makes a smooth inner wall with no girts, eliminating dust catching, which effectively turns the wall constructed thereof inside out with the inner wall load bearing, so that the exterior panel is not critical, which allows design freedom for maximum economy in room systems having no wind columns, and which otherwise fulfills the objects and advantages sought.

Objects of the novel retainer clamp are to provide a strong, effective unit which readily cooperates with the present novel wall.

The foregoing and other objects and advantages are apparent from the description below taken with the accompanying drawings.

DESCRIPTION OF THE DRAWINGS

FIG. 1 is a fragmentary interior elevational view of a wall incorporating the teachings of the present invention, portions of three wall modules being included;

FIG. 2 is a fragmentary exterior elevational view similar to FIG. 1;

FIG. 3 is an enlarged transverse horizontal cross-sectional view taken on substantially the line 3—3 of FIG. 1;

FIG. 4 is a further enlarged module fragmentary detail showing the juncture of the Z structural member and one channel panel wall;

FIG. 5 is a module fragmentary detail on the scale of FIG. 4, illustrating the other channel panel wall cross-section;

FIG. 6 is a fragmentary detail on the scale of FIG. 4, showing the juncture of two wall modules; and FIG. 7 is an isometric fragmentary view showing the present clip operatively maintaining a wall module against a roof member permitting relative vertical movement.

DESCRIPTION OF A PREFERRED EMBODIMENT

Referring to the drawings more particularly by reference numerals, 16 indicates generally a wall module incorporating the teachings of the present invention. The wall module 16 includes a structural Z member 18 and a channel panel 20 integrated by welding. The Z member 18 has a web 22, opposed spaced main flanges 23 and 24, and a return flange 25 (FIG. 4). The channel panel 20 has a wide bight 28, right angular walls 29 and 30, and lap flanges 31 and 32 extending in the same direction.

The flange 23 abuts the bight 28 at one side thereof and the return flange 25 abuts the wall 29 and is inwardly of the flange 31. Welds 34 firmly secure the return flange 25 and wall 29 together, the welds 34 being substantially midway of the return flange 25 and wall 29 and being spaced on about one foot centers for the length of the wall module 16. A strong unit is thus provided which can be factory constructed, stored, shipped and field erected.

It will be understood that the wall 30 is enough deeper than the wall 29 to permit lapping of the flange 32 over an adjacent flange 31, as is clear from FIG. 6. It will also be understood that the specifications of the Z member 18 and the panel 20 may be varied as required as to dimensions, gage, equivalent configurations, and otherwise. Ten and twelve foot modules are in use.

FIGS. 1 and 2 illustrate a fragmentary section of no-girt wall formed of wall modules 16. Each module 16 snugly interfits with adjacent wall modules 16 to provide the smooth no-girt inner surface, there being no overlap problem. The wall modules 16 are bolted or otherwise secured to vertically spaced horizontal interior sub-girts 35. The joints between wall modules 16 may be sealed with silicone, Thiokol, or the like, to bar vermin. Insulation 37 may be provided. Outer paneling 38 of any desired configuration is bolted to the sub-girts 35, or otherwise secured in place.

Wall retainer clips 40 are provided, each having an offset portion 41. In FIG. 7, a retainer clip 40 is illustrated welded to a truss 42 forming part of a roof, the offset portion 41 extending downwardly and engaging the flange 23 of a Z member 18 in a manner permitting downward deflection of the truss 42 when under a load greater than the dead load without compressive strain on the wall module 16. Such truss deflection occurs where massive overhead cranes, and the like, are employed, or where other live loads occur, as snow and wind. The relationship of the retainer clip 40 to the wall module 16 can be varied as required, for example, the clip 40 may be secured to the Z member 18 with the offset portion 41 extending upwardly to engage a roof member.

It is apparent that there have been provided a novel no-girt wall module and wall made thereof, method of fabricating the wall module, and retainer clip for the wall which fulfill the objects and advantages sought therefor.

It is to be understood that the foregoing description and the accompanying drawings have been given by way of illustration and example. It is also to be understood that changes in form of the elements or steps, rearrangement of parts or steps, and substitution of equivalent elements or steps, which will be obvious to those skilled in the art, are contemplated as within the scope of the present invention which is limited only by the claims which follow.

I claim:

1. In combination, a wind-load bearing no-girt wall comprising a plurality of wind load-bearing modules, each comprising an elongated vertical structural Z member and the like including a web, a main flange and a return flange, an elongated wide channel panel including a bight and vertical side walls, said main flange being disposed against said bight and said return flange being contiguous to one wall, and welding securing said return flange and said one wall together thereby integrating said Z member and said channel panel, said wall modules being secured together in interengaging relationship providing a smooth girt-free inner wall surface, said Z members and integrated channel panels forming the girt-free inner wall bearing wind loads and the like.

2. The combination of claim 1 in which said welding of each wall module is between the longitudinal boundaries of the return flange and said one wall and is spaced longitudinally thereof.

3. The combination of claim 2 in which each wall module panel includes lap flanges integral with its panel walls extending in the same direction, one wall of each panel being of greater depth than the other wall facilitating overlap of the lap panels.

4. The combination of claim 1 and including retainer clips adapted to be secured to substantially stationary roof structure adapted to maintain said wall against pulling away from established vertcial position between said clips and stationary roof structure, said retainer clips adapted to provide relative vertical movement between said wall and associated dead load bearing roof structure.

5. The combination of claim 4 in which each retainer clip includes an attachment portion and an offset portion.

References Cited
UNITED STATES PATENTS

| | | | |
|---|---|---|---|
| 1,796,114 | 1931 | Meadowcroft | 52—615 |
| 2,139,322 | 12/1938 | Miner | 52—474 |
| 2,717,664 | 9/1955 | Grafman | 52—508X |
| 2,847,099 | 8/1958 | Gruber | 52—588X |
| 2,991,855 | 7/1961 | Buell | 52—588X |
| 3,136,397 | 6/1964 | Eckel | 52—481 |
| 3,315,428 | 4/1967 | Goldstein | 52—235X |

FOREIGN PATENTS

| | | | |
|---|---|---|---|
| 1,173,600 | 1959 | France | 52—619 |

JOHN E. MURTAGH, Primary Examiner

U.S. Cl. X.R.

52—479, 483, 542